United States Patent
Tsubouchi et al.

(10) Patent No.: US 7,472,968 B2
(45) Date of Patent: Jan. 6, 2009

(54) VACUUM TYPE BRAKE BOOSTER

(75) Inventors: Kaoru Tsubouchi, Toyota (JP); Koichi Hashida, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 375 days.

(21) Appl. No.: 11/474,476

(22) Filed: Jun. 26, 2006

(65) Prior Publication Data
US 2006/0288859 A1 Dec. 28, 2006

(30) Foreign Application Priority Data
Jun. 28, 2005 (JP) ............................. 2005-188010

(51) Int. Cl.
*B60T 8/44* (2006.01)
(52) U.S. Cl. .................................. 303/114.3; 91/376 R
(58) Field of Classification Search .............. 303/114.3; 91/369.1–369.3, 376 R
See application file for complete search history.

(56) References Cited

U.S. PATENT DOCUMENTS 7,014,276 B2 * 3/2006 Miwa et al. .............. 303/114.3
7,255,408 B2 * 8/2007 Miwa et al. ............... 303/114.3
2005/0092167 A1 * 5/2005 Tsubouchi et al. ........ 91/376 R
2005/0098029 A1 * 5/2005 Tsubouchi et al. ........ 91/376 R

FOREIGN PATENT DOCUMENTS

JP 11-334573 12/1999

* cited by examiner

*Primary Examiner*—Christopher P Schwartz
(74) *Attorney, Agent, or Firm*—Buchanan Ingersoll & Rooney PC

(57) ABSTRACT

In a vacuum type brake booster, the reaction of output transmitted from an output shaft to a reaction member is transmitted to a valve body, a plunger, and a stepped pin. A valve mechanism, which is assembled to an axial hole of the valve body, includes an atmospheric valve seat which advances and retreats together with the plunger, a vacuum valve seat assembled to the valve body to advance and retreat, and a valve member having an atmospheric valve portion which forms an atmospheric valve in cooperation with the atmospheric valve seat and a vacuum valve portion which forms a vacuum valve in cooperation with the vacuum valve seat. The stepped pin is pushed rearward when a corresponding portion of the rear surface of the reaction member deforms and bulges rearward, and pushes the vacuum valve seat rearward in relation to the valve body.

6 Claims, 4 Drawing Sheets

VACUUM TYPE BRAKE BOOSTER

BACKGROUND OF THE INVENTION

1. Field of the Invention

The present invention relates to a vacuum type brake booster for an automobile, and more particularly to a vacuum type brake booster which has a movable wall dividing the interior of a housing into a vacuum chamber and a variable pressure chamber and which boosts an input force by means of pressure difference between the vacuum chamber and the variable pressure chamber and outputs the boosted force.

2. Description of the Related Art

A vacuum type brake booster of the above-described type is disclosed in, for example, Japanese Patent Application Laid-Open (kokai) No. H11-334573. In the disclosed vacuum type brake booster, a valve body is secured to the movable wall dividing the interior of the housing into a vacuum chamber and a variable pressure chamber, and an axial hole is formed in the valve body. An input member and a valve mechanism are disposed in the axial hole. The input member is axially movable in relation to the valve body. The valve mechanism includes a vacuum valve which provides a connection between the vacuum chamber and the variable pressure chamber and cut off the connection in response to axial movement of the input member in relation to the valve body, and an atmospheric valve which provides a connection between the variable pressure chamber and the atmosphere and cut off the connection in response to axial movement of the input member in relation to the valve body. The vacuum type brake booster further includes a reaction member and an output member. A front end portion of the input member can come into engagement with a first portion of the rear surface of the reaction member, which first portion can deform and bulge toward the rear. The output member is axially movable in relation to the valve body, and is engaged, at its rear end portion, with the front surface of the reaction member. When the input member advances in relation to the valve body, the vacuum valve closes and cut off the connection between the vacuum chamber and the variable pressure chamber, and the atmospheric valve opens and provides a connection between the variable pressure chamber and the atmosphere. As a result, an output corresponding to the differential pressure between the vacuum chamber and the variable pressure chamber is produced at the output member, and the reaction of the output is transmitted from the output member to the front surface of the reaction member, and then transmitted from the rear surface of the reaction member to the valve body and the input member.

In the vacuum type brake booster disclosed in the above-mentioned publication, the valve mechanism has an atmospheric valve seat which is axially movable together with the input member, a vacuum valve seat which is disposed coaxially with the atmospheric valve seat and assembled to the valve body to be axially movable, and a valve body having an atmospheric valve portion which constitutes the above-mentioned atmospheric valve in cooperation with the atmospheric valve seat and a vacuum valve portion which constitutes the above-mentioned vacuum valve in cooperation with the vacuum valve seat. The vacuum valve seat is moved rearward by means of operation oil supplied from the pressure oil chamber of a master cylinder assembled to the front of the vacuum type brake booster. Therefore, an oil chamber communicating with the pressure oil chamber of the master cylinder is provided within the vacuum type brake booster, whereby the operation oil is supplied from the pressure oil chamber of the master cylinder to the oil chamber within the vacuum type brake booster. Accordingly, the structure for moving the vacuum valve seat to the rear becomes complex, which may result in an increase in cost of the vacuum type brake booster.

SUMMARY OF THE INVENTION

An object of the present invention is to provide a vacuum type brake booster which is simple in structure and which can reduce production cost.

Another object of the present invention is to provide a vacuum type brake booster which can increase the boosting ratio at the beginning of operation and the jumping output and which can shorten the operation stroke of an input shaft.

In order to achieve the above object, the present invention provides a vacuum type brake booster comprising a housing for defining at least one pressure chamber therein; a movable wall disposed in the housing to divide the pressure chamber into a vacuum chamber and a variable pressure chamber; a valve body secured to the movable wall and having an axial hole; an input member disposed in the axial hole to be axially movable in relation to the valve body; a valve mechanism disposed in the axial hole and including a vacuum valve which provides a connection between the vacuum chamber and the variable pressure chamber and cut off the connection in response to axial movement of the input member in relation to the valve body, and an atmospheric valve which provides a connection between the variable pressure chamber and the atmosphere and cut off the connection in response to axial movement of the input member in relation to the valve body;a reaction member having a rear surface with which a front end portion of the input member can come into engagement at a first portion of the rear surface, the first portion being capable of deforming and bulging toward the rear; and an output member axially movable in relation to the valve body and engaged, at its rear end portion, with a front surface of the reaction member. When the input member advances in relation to the valve body, the vacuum valve closes and cut off the connection between the vacuum chamber and the variable pressure chamber, and the atmospheric valve opens and provides the connection between the variable pressure chamber and the atmosphere, whereby an output corresponding to the differential pressure between the vacuum chamber and the variable pressure chamber is produced at the output member, and the reaction of the output is transmitted from the output member to the front surface of the reaction member, and then transmitted from the rear surface of the reaction member to the valve body and the input member. The valve mechanism includes an atmospheric valve seat which advances and retreats together with the input member, a vacuum valve seat assembled to the valve body to advance and retreat, and a valve member having an atmospheric valve portion which forms the atmospheric valve in cooperation with the atmospheric valve seat and a vacuum valve portion which forms the vacuum valve in cooperation with the vacuum valve seat. The reaction member has a second portion on the rear surface, the second portion deforming and bulging rearward in the same manner as the first portion when an output is produced at the output member, and the rearward bulging deformation of the second portion is transmitted to the vacuum valve seat via a transmission member assembled to the valve body to be axially movable.

In the vacuum type brake booster, when the input member is axially advanced in relation to the valve body, the vacuum valve closes to thereby cut off the connection between the vacuum chamber and the variable pressure chamber, and the atmospheric valve opens to thereby provide the connection between the variable pressure chamber and the atmosphere. Therefore, air flows into the variable pressure chamber, so that the pressure in the variable pressure chamber gradually increases from the vacuum to the atmospheric pressure, and an output corresponding to the difference pressure between the vacuum chamber and the variable pressure chamber is produced at the output member. Further, when the output is produced at the output member, a reaction thereof is transmitted from the output member to the front surface of the reaction member and then transmitted from the rear surface of the reaction member to the valve body and the input member.

At this time, the first portion of the rear surface of the reaction member deforms and bulges rearward and comes into engagement with the front end portion of the input member, and the second portion of the rear surface of the reaction member similarly deforms and bulges rearward. This bulging deformation is transmitted via the transmission member to the vacuum valve, whereby the vacuum valve is pushed rearward in relation to the valve body. As a result, the valve member of the valve mechanism is pushed rearward, and the clearance between the atmospheric valve portion of the valve member and the atmospheric valve seat integral with the input member; i.e., the degree of opening of the atmospheric valve of the valve mechanism, increases. Thus, it becomes possible to increase the boosting ratio of the vacuum type brake booster at the beginning of operation and to increase the jumping output. Further, the operation stroke (the amount of forward movement) of the input member can be shortened.

Incidentally, in the present invention, the vacuum type brake booster is configured such that upon a rearward bulging deformation of the second portion of the rear surface of the reaction member, the vacuum valve seat is moved rearward via the transmission member; i.e., the vacuum type brake booster utilizes the characteristic (characteristic of deforming and bulging rearward) of the reaction member, which is an existing component. Therefore, the structure can be simplified as compared with that of a conventional vacuum type brake booster in which an oil chamber communicating with the pressure oil chamber of a master cylinder assembled to the front side of the vacuum type brake booster is provided within the vacuum type brake booster, and the vacuum valve seat is moved rearward by means of the operation oil supplied from the pressure oil chamber of the master cylinder to the oil chamber of the vacuum type brake booster.

When the present invention is embodied, the amount of axial movement of the transmission member in relation to the valve body may be set to a predetermined value. In this case, the characteristic of the vacuum type brake booster at the beginning of operation can be properly set through proper setting of the amount of axial movement of the transmission member, whereby various needs can be easily coped with.

When the present invention is embodied, the transmission member may be a pin which is axially movably assembled to a hole formed in the valve body and which is separated from the input member in the radially outward direction. In this case, since the pin is disposed away from the input member in the radially outward direction, the characteristic determined by the relation among the input member, the reaction member, and the valve body and the characteristic determined by the relation among the pin, the reaction member, and the valve body can be set independently. Therefore, the characteristic of the vacuum type brake booster at the beginning of operation can be easily set.

When the present invention is embodied, the transmission member may be a sleeve which is coaxially assembled to the outer circumference of the input member and which is axially movable between the input member and the valve body. In this case, the second portion can be continuously formed on the rear surface of the reaction member to surround the first portion, so that the reaction member deforms and bulges rearward at a single location, whereby the amount of the bulging deformation can be increased, and the rearward bulging deformation of the reaction member becomes easier to achieve.

When the present invention is embodied, the vacuum valve seat, which surrounds the input member, may be airtightly assembled to the wall surface of the axial hole of the valve body via a seal member, and a compression spring may be interposed between the vacuum valve seat and the input member. In this case, when the input member is axially retracted in relation to the valve body for retracting operation of the vacuum type brake booster, the vacuum valve seat can be reliably advanced in relation to the valve body by means of the compression spring interposed between the vacuum valve seat and the input member.

When the present invention is embodied, a key member, which defines a rearward home position of the valve body, has positioning means for causing the vacuum valve seat to come into engagement with the valve body in the axial direction when the valve body returns to the rearward home position. In this case, the positioning means of the key member reliably defines the initial position (home position) of the vacuum valve seat in relation to the valve body, whereby stable operation can be attained.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Figure 1:
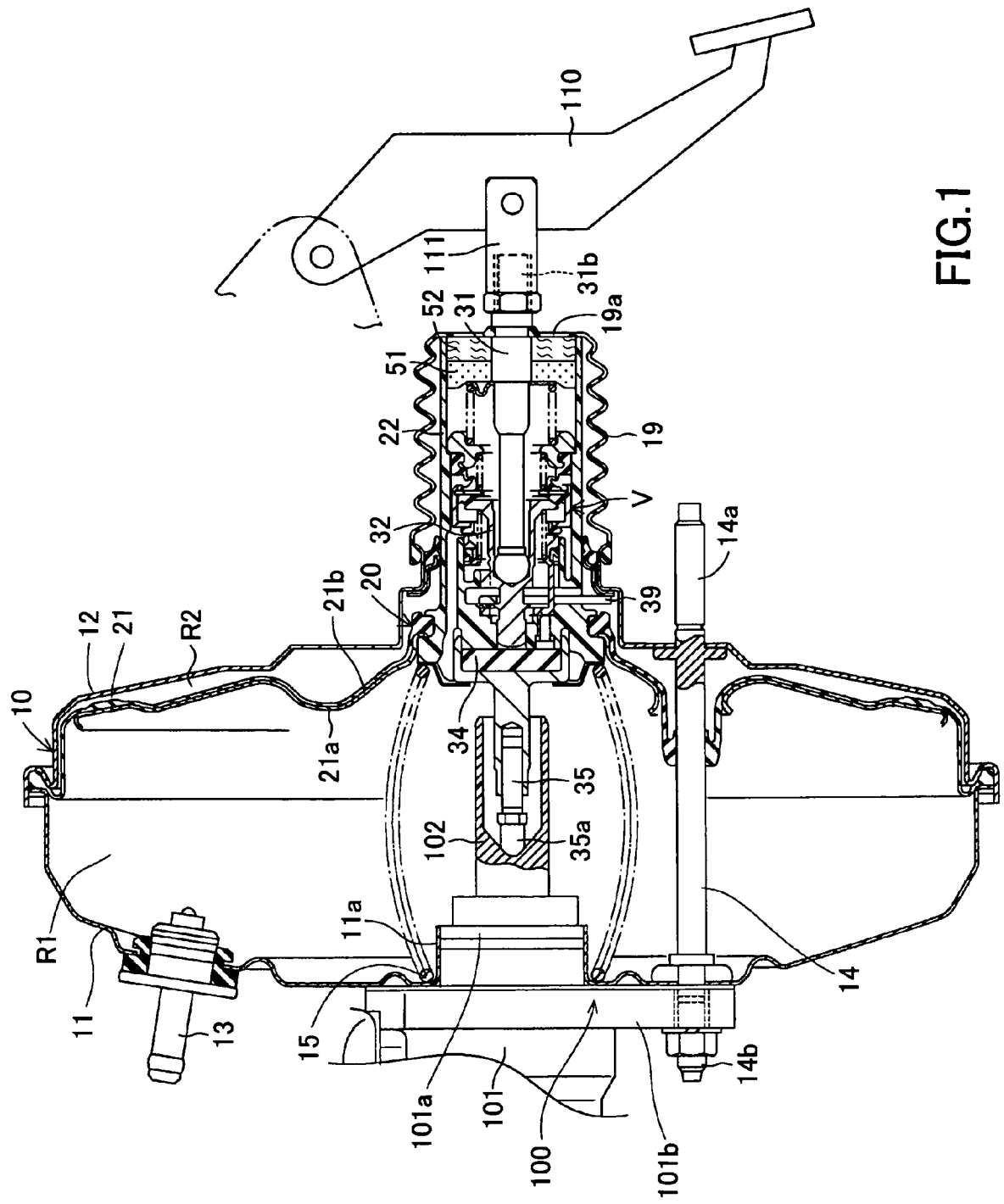
FIG. 1 is a sectional view showing a first embodiment of a vacuum type brake booster according to the present invention.
Figure 2:
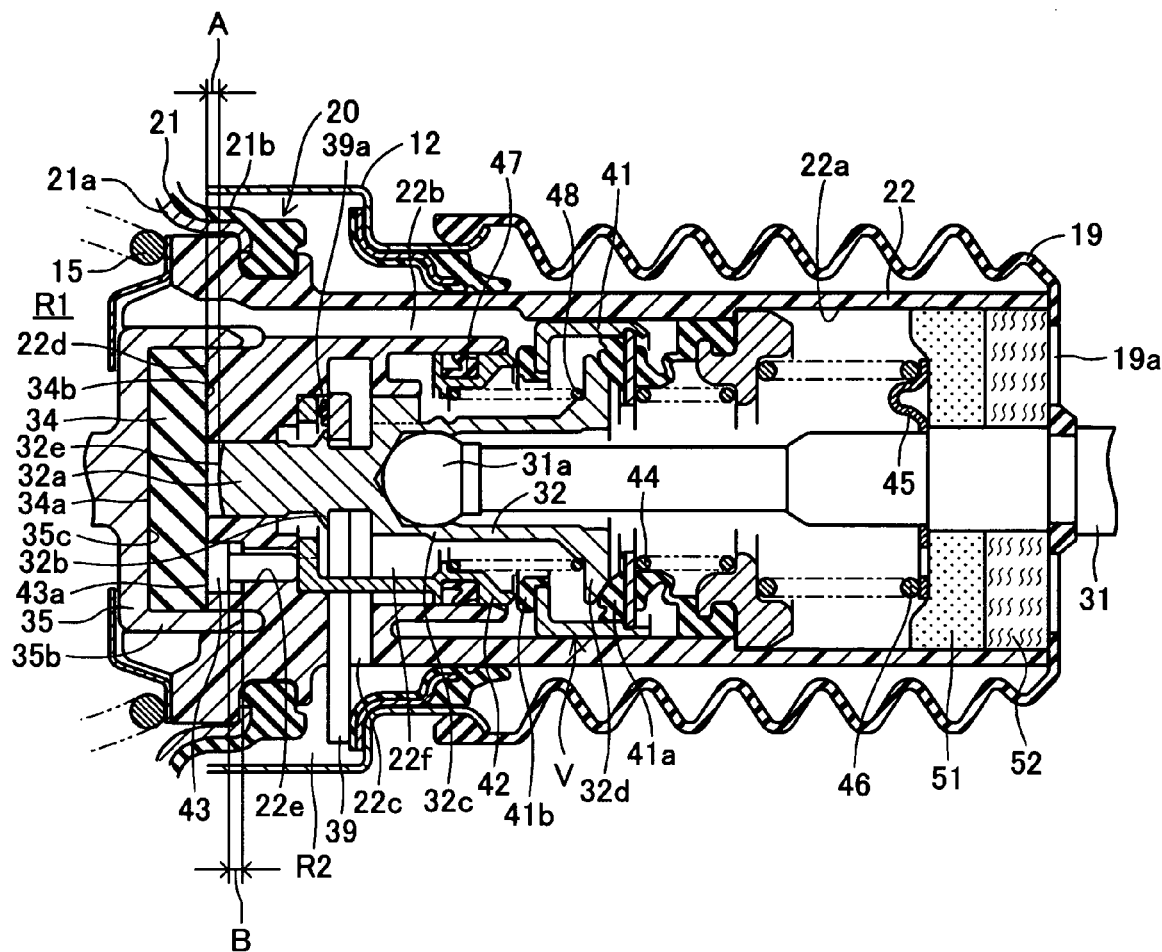
FIG. 2 is an enlarged partial sectional view of the vacuum type brake booster shown FIG. 1.

Embodiments of the present invention will next be described in detail with reference to the drawings. FIGS. 1 and 2 show a first embodiment in which the present invention is applied to a vacuum type brake booster of a brake system for a vehicle. In the vacuum type brake booster of the present embodiment, a power piston 20 including a movable wall 21 and a valve body 22 is assembled to a housing 10, and the interior of the housing 10 is divided into a front-side vacuum chamber R1 and a rear-side variable pressure chamber R2 by means of the movable wall 21.

As shown in FIG. 1, the housing 10 defines a pressure chamber therein and includes a front shell 11 and a rear shell 12, and is provided with a vacuum introduction pipe 13 for providing a connection between the vacuum chamber R1 and a vacuum source (e.g., the intake manifold of an unillustrated engine) at all times. The housing 10 is fixedly attached to a stationary member; i.e., a vehicular body (not shown), by means of threaded rear end portions 14a of a plurality of tie rods 14 (FIG. 1 shows only a single tie rod 14). The tie rods 14 extend airtightly through the housing 10 and the movable wall 21. Notably, a brake master cylinder 100 is fixedly connected to threaded front end portions 14b of the tie rods 14.

A rear end portion 101a of a cylinder body 101 of the brake master cylinder 100 airtightly extends through a central cylinder portion 11a of the front shell 11 and projects into the vacuum chamber R1. The rear surface of a flange portion 101b of the cylinder body 101 abuts the front surface of the front shell 11. A piston 102 of the brake master cylinder 100 projects rearward into the vacuum chamber R1 from the cylinder body 101 and is pushed frontward by means of a front end rod portion 35a of an output shaft 35, which will be described later.

The movable wall 21 of the power piston 20 includes an annular metal plate 21a and an annular rubber diaphragm 21b and is disposed within the housing 10 such that the movable wall 21 can move in a front-rear direction (the axial direction of the power piston 20). The diaphragm 21b is airtightly sandwiched, at its annular bead portion formed at its outer peripheral edge, between the front shell 11 and a peripheral bend edge portion of the rear shell 12. The diaphragm 21b, together with an inner peripheral portion of the plate 21a, is airtightly and fixedly fitted, at its annular bead portion formed at its inner peripheral edge, into a circumferential groove formed on the outer circumference of a front end portion of the valve body 22.

The valve body 22 of the power piston 20 is a hollow body formed of resin and secured to an inner peripheral portion of the movable wall 21. An intermediate portion of the valve body 22 formed into a cylindrical shape is airtightly assembled to the rear shell 12 of the housing 10 such that the valve body 22 can move in the front-rear direction. The valve body 22 is biased or urged rearward by means of a return spring 15 disposed between the valve body 22 and the front shell 11 of the housing 10. Notably, a portion of the valve body 22 projecting from the housing 10 is covered and protected by means of a boot 19 having a plurality of vent holes 19a formed at its rear end.

As shown in FIG. 2, a stepped axial hole 22a extends through the valve body 22 in the front-rear direction. A connection hole 22b is formed in the valve body 22 such that its rear end communicates with an intermediate stepped portion of the axial hole 22a and its front end communicates with the vacuum chamber R1. Further, a key attachment hole 22c is formed in the valve body 22 to generally perpendicularly intersect a front portion of the axial hole 22a. A key member 39 can be inserted into the key attachment hole 22c from the outer periphery of the valve body 22.

An input shaft 31 and a plunger 32 (i.e., an input member) are assembled into the axial hole 22a. Further, a valve mechanism V and filters 51 and 52 are assembled into the axial hole 22a. Moreover, a reaction member 34 and the output shaft 35 (an output member) are assembled into the axial hole 22a to be located forward of the input shaft 31 and the plunger 32 and be coaxial with the input shaft 31 and the plunger 32. An annular vacuum valve seat 42, which is one component of the valve mechanism V, is coaxially assembled to the outer periphery of the plunger 32 to be coaxial therewith.

The input shaft 31, which can advance and retract with respect to the valve body 22, is articularly joined, at its spherical end portion 31a, to a support-connection portion 32c of the plunger 32, and is connected, at its rear end threaded portion 31b (see FIG. 1), to a brake pedal 110 via a yoke 111. Thus, the input shaft 31 receives a depressing force acting on the brake pedal 110, as an input Fi directed frontward.

The plunger 32 can abut, at its front end portion 32a, a first portion (central portion) of the rear surface of the reaction member 34. An annular flange portion 32b formed at an intermediate portion of the plunger 32 is engageable with the key member 39. The front end portion 32a of the plunger 32 partially receives reaction force of the output Fo from the reaction member 34. An annular atmospheric valve seat 32d is formed at the rear end of the plunger 32 such that the atmospheric valve seat 32d can be seated on and separated from an annular atmospheric valve portion 41a of the valve mechanism V. The atmospheric valve seat 32d and the atmospheric valve portion 41a of the valve mechanism V constitute an atmospheric valve which provides a connection between the variable pressure chamber R2 and the atmosphere and cut of the connection.

The reaction member 34 is a reaction rubber disk whose rear end surface can deform and bulge rearward at a first portion (a portion facing the front surface 32e of the plunger 32) and a second portion (a portion facing a larger diameter end surface 43a of a stepped pin 43 to be described later). The reaction member 34 is assembled to a front end portion of the valve body 22 such that the reaction member 34 is accommodated within a rear cylindrical portion 35b of the output shaft 35 and the entirety of a front end surface 34a of the reaction member 34 is in engagement with a rear end portion rear surface 35c of the output shaft 35. The reaction member 34 has a rear surface 34b which faces the front face 32e of the plunger 32 with a predetermined clearance A therebetween, and which can come into contact with the front face 32e. The rear surface 34b of the reaction member 34 is also in contact with an annular end surface 22d of the valve body 22 and the larger-diameter end surface 43a of the stepped pin 43 assembled to the valve body 22.

The output shaft 35, together with the reaction member 34, is assembled into the front end portion of the axial hole 22a of the valve body 22 such that the output shaft 35 can move in the front-rear direction. As shown in FIG. 1, the front end rod portion 35a, which is attached to the tip end of the output shaft 35, is in engagement with an engagement portion of the piston 102 of the brake master cylinder 100 such that the output shaft 35 can push and move the piston 102. During braking operation, the output shaft 35 transmits to the reaction member 34 the reaction force received from the piston 102 of the brake master cylinder 100.

The key member 39 has a function of restricting the frontward/rearward movement of the plunger 32 with respect to the valve body 22 of the power piston 20, as well as a function of defining a limit regarding rearward movement of the power piston 20 with respect to the housing 10 (the rearward home position of the valve body 22). The key member 39 is assembled to the valve body 22 and the plunger 32 to be relatively movable in the axial direction of the power piston 20.

The valve mechanism V includes the annular atmospheric valve seat 32d integrally formed on the plunger 32, a cylindrical valve member 41 disposed coaxially with the atmospheric valve seat 32d and assembled to the valve body 22, and the annular vacuum valve seat 42. The valve member 41 includes the above-mentioned annular atmospheric valve portion 41a, which can be seated on and separated from the atmospheric valve seat 32d and which constitutes, in cooperation with the atmospheric valve seat 32d, an atmospheric valve which provides a connection between the variable pressure chamber R2 and the atmosphere and cut off the connection. The valve member 41 also includes an annular atmospheric valve portion 41b, which can be seated on and separated from the vacuum valve seat 42 and which constitutes, in cooperation with the vacuum valve seat 42, a vacuum valve which provides a connection between the vacuum chamber R1 and the variable pressure chamber R2 and cut off the connection.

The atmospheric valve portion 41a and the vacuum valve portion 41b are integrally formed on a movable portion (a portion movable in the axial direction) of the valve member 41, and are urged or biased toward the atmospheric valve seat 32d and the vacuum valve seat 42 (toward the front) by means of a compression spring 44. Notably, a stationary portion (a portion which cannot move in the axial direction) of the valve member 41 is urged forward by means of a compression spring 46, which is in engagement with a stepped portion of the input shaft 31 via a retainer 45, whereby the valve member 41 is held at a predetermined position (stepped portion) within the axial hole 22a of the valve body 22.

The vacuum valve seat 42, which surrounds the plunger 32, is airtightly assembled to the wall surface of the axial hole 22a of the valve body 22 via an annular seal member 47. In an initial position (at the rearward home position of the valve body 22), the vacuum valve seat 42 is in contact with a stepped portion of the axial hole 22a of the valve body 22 while being in elastic contact with a rubber stopper 39a assembled to the front surface of the key member 39, to thereby be axially positioned. A compression spring 48 having a mounting load greater than the sliding resistance of the seal member 47 is interposed between the vacuum valve seat 42 and the plunger 32.

The stepped pin 43 is provided at two positions equally spaced in the circumferential direction such that the stepped pin 43 is separated from the plunger 32 in the radially outward direction. Notably, the number of the stepped pins 43 can be changed freely. The stepped pin 43 is received in an axially extending stepped hole 22e, which is provided parallel to the axial hole 22a of the valve body 22 and whose diameter is increased at the front end thereof, such that the stepped pin 43 can move in the axial direction. The stepped pin 43 functions as a transmission member when the second portion (a portion with which the larger diameter end surface 43a is in contact) of the rear surface of the reaction member 34 deforms and bulges rearward, to thereby transmit the bulging deformation to the vacuum valve seat 42. The amount of axial movement of the stepped pin 43 in relation to the valve body 22 is set to a predetermined value B. Notably, a narrow auxiliary groove is formed on the wall surface of a smaller diameter portion of the stepped hole 22e, and particles or the like produced as a result of wear of the reaction member 34 are discharged through the narrow auxiliary groove.

By virtue of the above-described structure of the valve mechanism V, the variable pressure chamber R2 can communicate with the vacuum chamber R1 or the atmosphere in accordance with the movement in the front-rear direction of the input shaft 31 and the plunger 32 with respect to the valve body 22. That is, when the input shaft 31 and the plunger 32 shown in FIGS. 1 and 2 move forward with respect to the valve body 22, whereby the vacuum valve portion 41b is seated on the vacuum valve seat 42 and the atmospheric valve seat 32d is separated from the atmospheric valve portion 41a, connection between the variable pressure chamber R2 and the vacuum chamber R1 is cut off, and connection between the variable pressure chamber R2 and the atmosphere is provided. At this time, air flows into the variable pressure chamber R2 via the vent holes 19a of the boot 19, the filters 51 and 52, the interior of the valve member 41, the clearance between the atmospheric valve seat 32d and the atmospheric valve portion 41a, a through hole 22f (see FIG. 2) and the key attachment hole 22c provided in the valve body 22, etc.

In a state as shown in FIGS. 1 and 2 in which the vacuum valve portion 41b is separated from the vacuum valve seat 42 and the atmospheric valve seat 32d is seated on the atmospheric valve portion 41a, the connection between the variable pressure chamber R2 and the atmosphere is cut off, and the connection between the variable pressure chamber R2 and the vacuum chamber R1 is provided. At this time, air is sucked from the variable pressure chamber R2 to the vacuum chamber R1 via the key attachment hole 22c and the through hole 22f provided in the valve body 22, the clearance between the vacuum valve portion 41b and the vacuum valve seat 42, the connection hole 22b, etc.

In the vacuum type brake booster of the first embodiment configured as descried above, when the brake pedal 110 is depressed and the input shaft 31 and the plunger 32 are advanced in relation to the valve body 22, the vacuum valve portion 41b is seated on the vacuum valve seat 42, whereby the vacuum valve is closed, and the connection between the vacuum chamber R1 and the variable pressure chamber R2 is cut off. Further, the atmospheric valve seat 32d is separated from the atmospheric valve portion 41a, whereby the atmospheric valve is opened, and the connection between the variable pressure chamber R2 and the atmosphere is provided. Therefore, air flows into the variable pressure chamber R2, so that the pressure in the variable pressure chamber R2 gradually increases from the vacuum to the atmospheric pressure, and an output Fo corresponding to the difference pressure between the vacuum chamber R1 and the variable pressure chamber R2 is produced at the output shaft 35. Further, when the output Fo is produced at the output shaft 35, a reaction thereof is transmitted from the output shaft 35 to the front surface 34a of the reaction member 34 and then transmitted from the rear surface 34b of the reaction member 34 to the valve body 22 and the plunger 32.

At this time, the first portion of the rear surface 34b of the reaction member 34 deforms and bulges rearward and comes into engagement with the front end portion 32a of the plunger 32, and the second portion of the rear surface 34b of the reaction member 34 similarly deforms and bulges rearward. This bulging deformation is transmitted via the stepped pin 43 to the vacuum valve 42 against the urging force of the compression spring 44, the urging force of the compression spring 48, the differential pressure force acting on the valve member 41 (force produced due to the difference between the vacuum and the atmospheric pressure acting on the front and rear sides of the valve member 41), etc. As a result, the vacuum valve 42 is pushed rearward in relation to the valve body 22.

As a result, the valve member 41 of the valve mechanism V is pushed rearward, to thereby increase the clearance between the atmospheric valve portion 41a of the valve member 41 and the atmospheric valve seat 32d integral with the plunger 32; i.e., the degree of opening of the atmospheric valve of the valve mechanism V. Thus, it becomes possible to increase the boosting ratio of the vacuum type brake booster at the beginning of operation as indicated by characteristic line a-c-d of FIG. 3. Further, the operation stroke (the amount of forward movement in relation to the housing 10) of the input member composed of the input shaft 31, the plunger 32, etc. can be shortened as compared with the case where the same output is produced by a conventional vacuum type brake booster in which the vacuum valve seat is fixedly disposed.

In the vacuum type brake booster of the present embodiment, the rear end portion rear surface 35c of the output shaft 35 retreats by an amount corresponding to the bulging volume of the second portion of the reaction member 34 bulging toward the valve body 22. However, since the ratio of the area of the larger-diameter end surface 43a of the stepped pin 43 to the area of the rear end portion rear surface 35c of the output shaft 35 is small, the above-mentioned retraction of the rear end portion rear surface 35c is small and can be ignored. Notably, in the case of a conventional vacuum type brake booster in which a vacuum valve seat corresponding to the above-described vacuum valve seat 42 is fixedly disposed in the axial hole 22a of the valve body 22, and the stepped pin 43 is not provided, at the beginning of operation, the boosting ratio increases as indicated by characteristic line a-b of FIG. 3.

Figure 3:
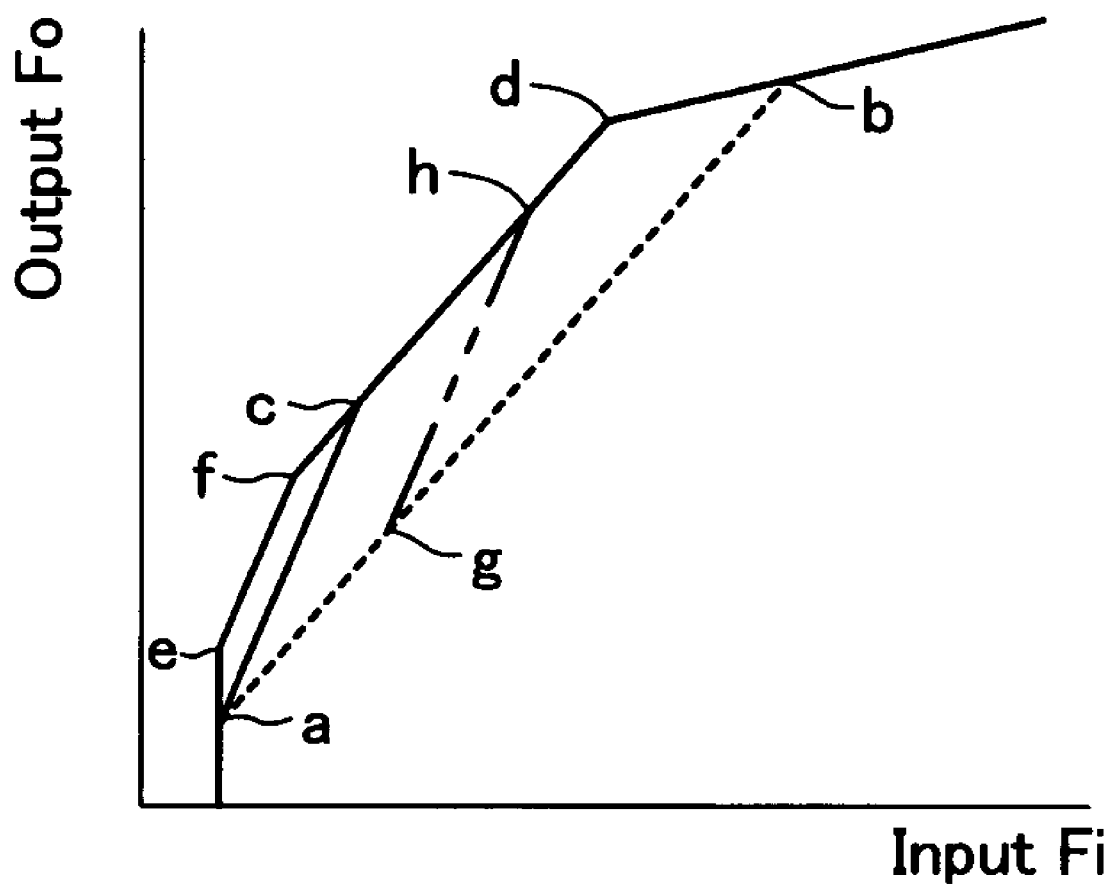
FIG. 3 is a graph showing the characteristic of the vacuum type brake booster according to the present invention.

In FIG. 3, characteristic line a-c shows the characteristic of the vacuum type brake booster of the first embodiment when the stepped pin 43 is moved rearward in relation to the valve body 22, and characteristic line c-d is parallel to the characteristic line a-b (the vacuum type brake booster has the same boosting ratio). Therefore, in the case of the vacuum type brake booster of the first embodiment, the point c can be rendered closer to the point d by increasing the movable distance of the stepped pin 43 in relation to the valve body 22 (the clearance B). Characteristic line e-f-d of FIG. 3 shows the characteristic when a predetermined clearance is provided between the larger diameter end surface 43a of the stepped pin 43 and the rear surface 34b of the reaction member 34 in the state shown in FIG. 2. Characteristic line e-f is parallel to the characteristic line a-c. Therefore, jumping output can be increased by providing a predetermined clearance between the larger diameter end surface 43a of the stepped pin 43 and the rear surface 34b of the reaction member 34 in the state shown in FIG. 2. Moreover, when the vacuum type brake booster is configured to reduce the clearance A of FIG. 2 to thereby reduce the jumping output and secure the output by the clearance B, as compared with the above-described first embodiment, the plunger 32 comes into the reaction member 34 earlier, whereby vibration generation at the beginning of operation can be suppressed.

The vacuum type brake booster of the first embodiment is configured such that upon a rearward bulging deformation of the second portion of the rear surface 34b of the reaction member 34, the vacuum valve seat 42 is moved rearward via the stepped pin 43; i.e., the vacuum type brake booster effectively utilizes the characteristic (characteristic of deforming and bulging rearward) of the reaction member 34, which is an existing component. Therefore, the structure can be simplified as compared with that of a conventional vacuum type brake booster in which an oil chamber communicating with the pressure oil chamber of a master cylinder assembled to the front side of the vacuum type brake booster is provided within the vacuum type brake booster, and the vacuum valve seat is moved rearward by means of the operation oil supplied from the pressure oil chamber of the master cylinder to the oil chamber of the vacuum type brake booster.

In the first embodiment, the amount of axial movement of the stepped pin 43 in relation to the valve body 22 is set to a predetermined value B. Therefore, the characteristic of the vacuum type brake booster at the beginning of operation can be properly set through proper setting of the clearance A between the plunger 32 and the reaction member 34 and the amount of axial movement of the stepped pin 43 (clearance B), whereby various needs can be easily coped with.

In the first embodiment, the transmission member which transmits the rearward bulging deformation of the second portion of the rear surface 34b of the reaction member 34 to the vacuum valve seat 42 is the stepped pin 43, which is axially movably assembled to the axially extending stepped hole 22e formed in the valve body 22 and having a larger diameter at the front end thereof, and which is separated from the plunger 32 in the radially outward direction. This configuration enables individual setting of the characteristic determined by the relation among the plunger 32, the reaction member 34, and the valve body 22 and the characteristic determined by the relation among the stepped pin 43, the reaction member 34, and the valve body 22. Therefore, the characteristic of the vacuum type brake booster at the beginning of operation can be easily set.

In the first embodiment, the vacuum valve seat 42, which surrounds the plunger 32, is airtightly assembled to the wall surface of the axial hole 22a of the valve body 22 via the annular seal member 47; and the compression spring 48 having a mounting load greater than the sliding resistance of the seal member 47 is interposed between the vacuum valve seat 42 and the plunger 32. Therefore, when the plunger 32 is axially retracted in relation to the valve body 22 for retracting operation of the vacuum type brake booster, the vacuum valve seat 42 can be reliably advanced in relation to the valve body 22 by means of the compression spring 48 interposed between the vacuum valve seat 42 and the plunger 32.

In the first embodiment, the key member 39, which defines the rearward home position of the valve body 22, has the rubber stopper 39a, which causes the vacuum valve seat 42 to come into engagement with the valve body 22 in the axial direction to thereby position the vacuum valve seat 42 when the valve body 22 returns to the rearward home position. Therefore, the rubber stopper 39a of the key member 39 reliably defines the initial position (home position) of the vacuum valve seat 42 in relation to the valve body 22, whereby stable operation can be attained.

Figure 4:
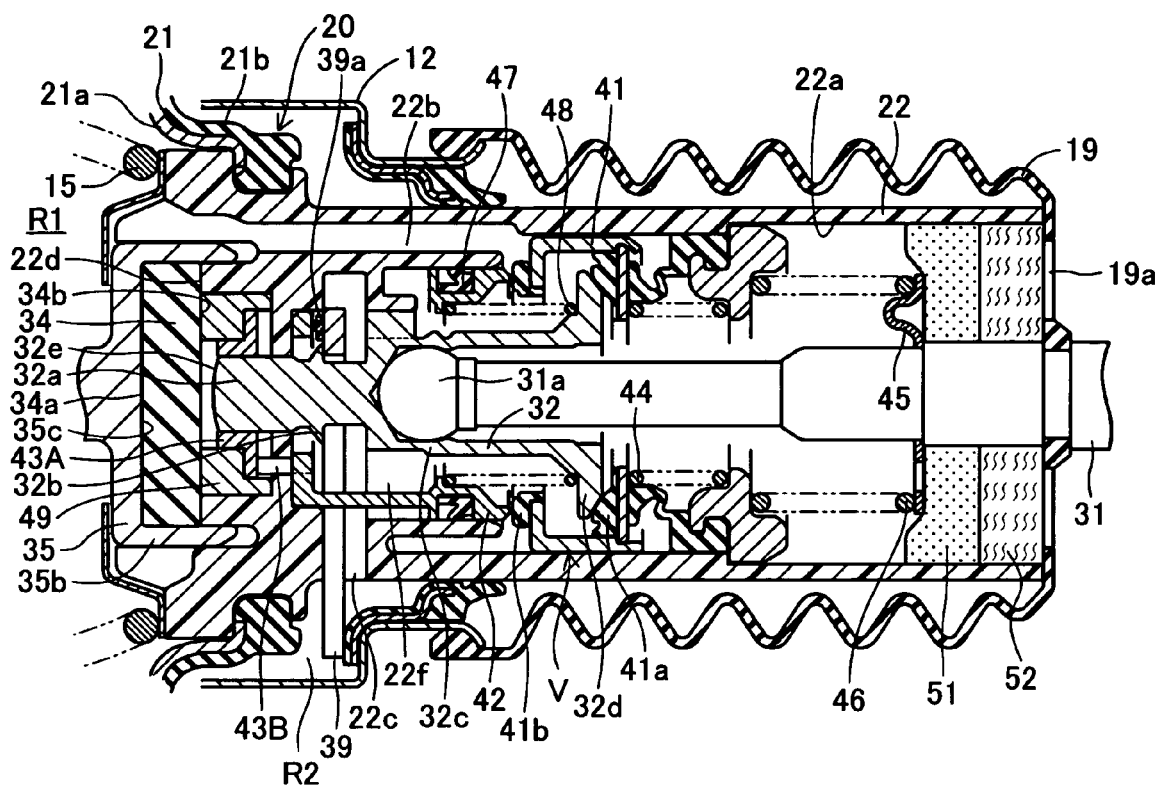
FIG. 4 is an enlarged partial sectional view showing a second embodiment of the vacuum type brake booster according to the present invention.

In the first embodiment, the stepped pin 43 functions as a transmission member for transmitting the rearward bulging deformation of the second portion of the rear surface 34b of the reaction member 34 to the vacuum valve seat 42. Alternatively, a sleeve 43A and a pin 43B of a second embodiment shown in FIG. 4 may be employed as the transmission member. The sleeve 43A has at its rear end a flange which extends radially outward, and is coaxially assembled to the outer circumference of the plunger 32. The sleeve 43A is axially movable between the plunger 32 and an annular stopper 49 secured to the valve body 22. The pin 43B is formed integrally with the flange of the sleeve 43A, and extends rearward, so that the rear end of the pin 43B is in contact with the vacuum valve seat 42.

In this second embodiment, the second portion can be continuously formed on the rear surface 34b of the reaction member 34 to surround the first portion, so that the reaction member 34 deforms and bulges rearward at a single location, whereby the amount of the bulging deformation can be increased, and the rearward bulging deformation of the reaction member 34 becomes easier to achieve. Further, in this second embodiment, the vacuum type brake booster can be configured in such a manner that the second portion of the rear surface 34b of the reaction member 34 comes into contact with the front surface of the sleeve 43A after the first portion of the rear surface 34b of the reaction member 34 comes into contact with the plunger 32. Thus, it becomes possible to increase the boosting ratio of the vacuum type brake booster at the beginning of operation as indicated by characteristic line a-g-h-d of FIG. 3, and to shorten the operation stroke (the amount of forward movement) of the input member composed of the input shaft 31, the plunger 32, etc.

What is claimed is:
1. A vacuum type brake booster comprising:
 a housing for defining at least one pressure chamber therein;

a movable wall disposed in the housing to divide the pressure chamber into a vacuum chamber and a variable pressure chamber;

a valve body secured to the movable wall and having an axial hole;

an input member disposed in the axial hole to be axially movable in relation to the valve body;

a valve mechanism disposed in the axial hole and including a vacuum valve which provides a connection between the vacuum chamber and the variable pressure chamber and cut off the connection in response to axial movement of the input member in relation to the valve body, and an atmospheric valve which provides a connection between the variable pressure chamber and the atmosphere and cut off the connection in response to axial movement of the input member in relation to the valve body;

a reaction member having a rear surface with which a front end portion of the input member can come into engagement at a first portion of the rear surface, the first portion being capable of deforming and bulging toward the rear; and an output member axially movable in relation to the valve body and engaged, at its rear end portion, with a front surface of the reaction member, wherein when the input member advances in relation to the valve body, the vacuum valve closes and cut off the connection between the vacuum chamber and the variable pressure chamber, and the atmospheric valve opens and provides the connection between the variable pressure chamber and the atmosphere, whereby an output corresponding to the differential pressure between the vacuum chamber and the variable pressure chamber is produced at the output member, and the reaction of the output is transmitted from the output member to the front surface of the reaction member, and then transmitted from the rear surface of the reaction member to the valve body and the input member, and wherein the valve mechanism includes an atmospheric valve seat which advances and retreats together with the input member, a vacuum valve seat assembled to the valve body to advance and retreat, and a valve member having an atmospheric valve portion which forms the atmospheric valve in cooperation with the atmospheric valve seat and a vacuum valve portion which forms the vacuum valve in cooperation with the vacuum valve seat; and the reaction member has a second portion on the rear surface, the second portion deforming and bulging rearward in the same manner as the first portion when an output is produced at the output member, and the rearward bulging deformation of the second portion is transmitted to the vacuum valve seat via a transmission member assembled to the valve body to be axially movable.

2. A vacuum type brake booster according to claim 1, wherein the amount of axial movement of the transmission member in relation to the valve body is set to a predetermined value.

3. A vacuum type brake booster according to claim 1, wherein the transmission member is a pin which is axially movably assembled to a hole formed in the valve body and which is separated from the input member in the radially outward direction.

4. A vacuum type brake booster according to claim 1, wherein the transmission member is a sleeve which is coaxially assembled to the outer circumference of the input member and which is axially movable between the input member and the valve body.

5. A vacuum type brake booster according to claim 1, wherein the vacuum valve seat surrounds the input member and is airtightly assembled to the wall surface of the axial hole of the valve body via a seal member, and a compression spring is interposed between the vacuum valve seat and the input member.

6. A vacuum type brake booster according to claim 1, wherein a key member, which defines a rearward home position of the valve body, has positioning means for causing the vacuum valve seat to come into engagement with the valve body in the axial direction when the valve body returns to the rearward home position.

* * * * *